United States Patent

[11] 3,620,893

| [72] | Inventor | Irvin S. Tarrson<br>Evanston, Ill. |
|---|---|---|
| [21] | Appl. No. | 873,871 |
| [22] | Filed | Nov. 4, 1969 |
| [45] | Patented | Nov. 16, 1971 |
| [73] | Assignee | Bell & Howell Company<br>Chicago, Ill. |

[54] FILM END CONSTRUCTION FOR SELF THREADING DEVICE
3 Claims, 7 Drawing Figs.

[52] U.S. Cl. .................................................. 161/109,
352/235
[51] Int. Cl. ...................................................... B32b 3/10

[50] Field of Search .......................................... 161/109,
110; 352/56, 158, 232, 233, 241, 235; 226/88, 91;
33/137, 137 L

[56] References Cited
OTHER REFERENCES

Allais, D. C. " Combination Rim Drive and Leader Flexing Roller" IBM Technical Disclosure Bulletin, Vol. 9, No. 7 December, 1966. p. 904 (In class 352-235).

Primary Examiner—John T. Goolkasian
Assistant Examiner—Robert A. Dawson
Attorney—Jack H. Hall

ABSTRACT: A novel film end construction for facilitating the self-threading of a film handling device.

PATENTED NOV 16 1971 3,620,893

FILM END CONSTRUCTION FOR SELF THREADING DEVICE

BACKGROUND OF THE INVENTION

This invention relates to self-threading microfilm readers and more particularly to an improved film design for facilitating self-threading operations. As will become apparent herein the principles of the present invention have applicability in other film-type self-threading devices such as cameras, movie projectors and tape recorders among others.

Because of the tedious and time consuming nature of a manual threading operation after a supply of film or tape has been inserted into an operative mechanism, it is highly desirable to eliminate that requirement and design the machine such that it is self-threading. Hereinafter the terms film and reader will be utilized but it is understood that those terms encompass tape and tape recorder respectively and other devices wherein it is necessary to expel a limp elongate material from a spool.

One of the major difficulties faced in self-threading devices is the initial expulsion of the leading end of the film from the supply spool into the drive train of the operative device. Normally a rather limp material, film will unwrap in an unpredictable fashion if an open supply spool is rotated. Since the motion of the film is not predictable some guiding mechanism must be provided. Often a spool of film is inserted into a magazine or cartridge before the threading operation begins. If the magazine is designed with guiding surfaces a second problem develops. As the supply spool rotates the film unwinds until its leading end contacts the magazine's guiding surface. After contact the film end will not follow the guiding surface but rather will stick or hang up because of friction between the two surfaces. The countervailing force developed by the film is not sufficient to overcome the frictional forces because of the film's limp nature.

Many prior art approaches, particularly in the magnetic tape field, have been developed to cope with the above problems. Some devices have employed air jets to guide the film end into the drive train of the reader. Others utilize couplings of various designs on the end of the film to permit positive grasping by an associated component of the machine. Still others overcome the limpness phenomenon by adding a leader section of stiff material to the end of the film. Obviously many of these approaches require complex, expensive mechanical devices and others require a time consuming operation by the user prior to reading the film.

SUMMARY

The instant invention provides a means and method for accomplishing the self-threading of a microfilm reader. Near the end of the film supply a limited portion is provided that is of greater width than the balance of the film and also wider than the distance between the flanges of an associated supply spool. An interior portion is weakened at the area of increased width such that when the film is wrapped upon the supply spool and the portion of increased width is squeezed between the flanges, the end of the film bows along its longitudinal axis. That bowing stiffens the film end and merely turning the supply spool will present the film end to the drive train of the reader which may then pull the supply from the spool in conventional manner.

This invention eliminates the need for complex, expensive machinery and eliminates the need to utilize a leader portion of different material than the film supply. The necessary geometry may be provided on the film supply itself or on a leader section which may be attached to the supply in a manner well known to those of ordinary skill in the art. If a leader is employed it need not be formed of a stiffer material than the film as leader system in the prior art have been effected.

Moreover by providing both ends of the supply with the geometry of the invention, rewind of the supply may be accomplished in the same manner as the initial threading operation.

DESCRIPTION OF THE PREFERRED EMBODIMENTS

Figure 1:
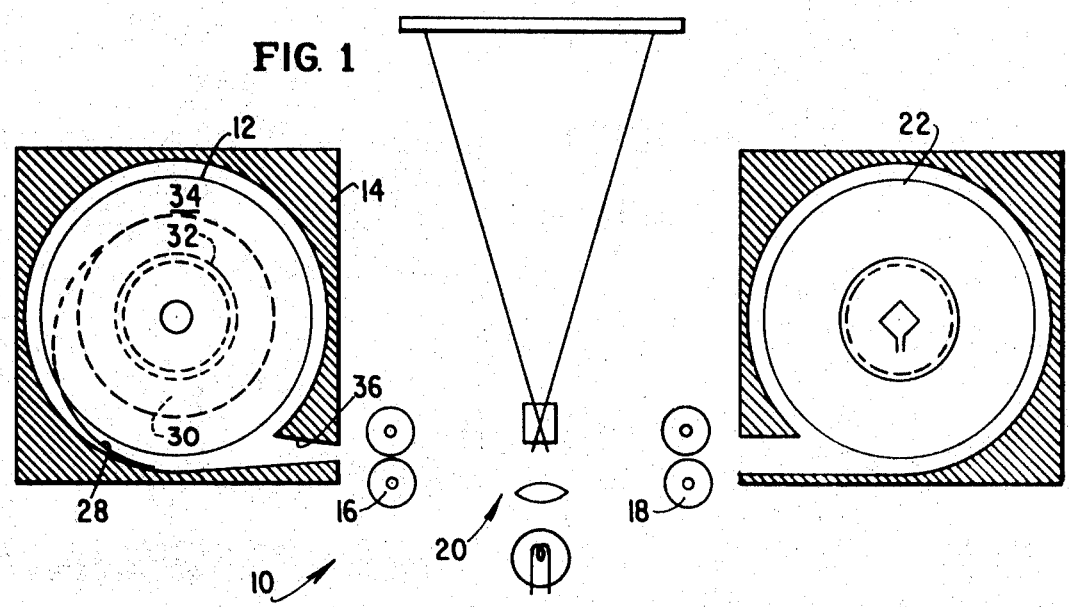
FIG. 1 is a microfilm reader utilizing this invention.

This invention may best be understood by referring to the microfilm reader, indicated generally by the reference numeral 10, shown in FIG. 1. The microfilm reader 10 includes a supply spool 12 encased within a magazine 14. Two sets of capstans 16 and 18 provide the motive force for moving film past the optical assembly 20 into the takeup spool 22. Suitable motors and gearing assemblies may be provided to turn the spools 12, 14 and the capstans 16, 18. Preferably the motive assembly is bidirectional thereby permitting reversal of the film movement for reading and rewinding purposes. Since a detailed description of the microfilm reader 10 is unnecessary to the understanding of this invention, it has been shown simply and somewhat schematically.

Figure 2:
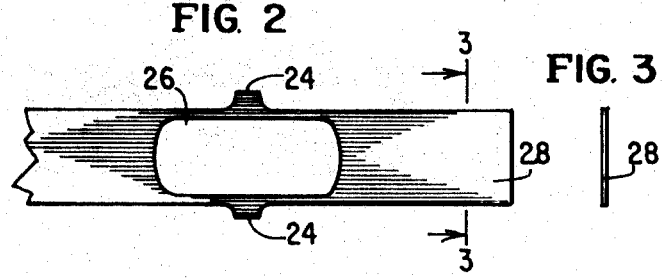
FIGS. 2 and 3 are a film end constructed in accordance with the principles of this invention.
Figure 3:
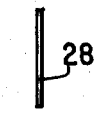

One embodiment of a film end employing the principles of this invention is shown in FIG. 2. The film end includes two tabs 24, 24 and an interior portion of film that has been weakened by a cutout 26. The tabs 24, 24 and the cutout 26 are spaced from the leading end 28 of the film. FIG. 3 is an end view of the film shown in FIG. 2, exaggerated in size for reasons of clarity, and it may be seen that the film is substantially rectangular in cross section.

Figure 7:
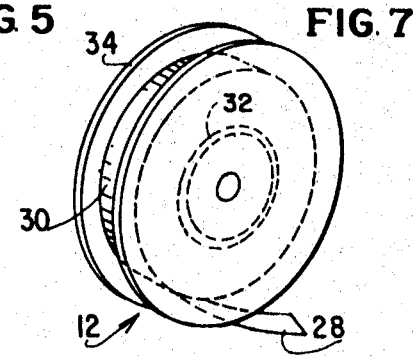

FIG. 7 illustrates a supply of film 30 wrapped around the hub 32 and between the flanges 34, 34 of a supply spool. The supply spool may be a standard spool conforming to specification PH 1.33-1961 promulgated by the American Standards Association, Incorporated for 16 mm., 100-foot film spools. The film 30 in FIG. 7 has the end geometry shown in FIG. 2. That geometry causes the leading end 28 to be upstanding from the bulk of the film 30.

Figure 4:
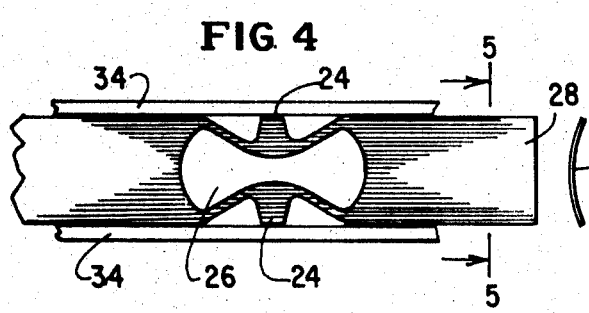
FIGS. 4, 5 and 7 show the film end of FIGS. 2 and 3 in operative engagement with a film spool.
Figure 5:
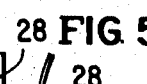

FIGS. 4 and 5 illustrate the reason that the film end 28 is upstanding in FIG. 7. As described previously, the width of the film where the tabs 24, 24 are located exceeds the distance between the flanges 34, 34 of the supply spool 12. As seen in FIG. 4, placement of the film between the flanges 34, 34 during a normal wrapping operation squeezes the tabs 24, 24 into the cutout 26. That squeezing causes the cross section of the film to bow as shown in FIG. 5. Having been bowed the film end 28 assumes greater rigidity in much the same manner as conventional metal measuring tapes or the like. The increase in rigidity associated with the bowing of the film end permits simplified self-threading in a manner to be described.

Referring to FIG. 1 it may now be appreciated that the film supply 30 has been equipped with the end geometry of FIG. 2 and therefore has a rigid upstanding end 28. It may be seen that the magazine 14 includes a guiding means 36, in this case in the form of a channel. It should be pointed out that many types of guiding devices or stripping fingers would be adequate. To thread the reader 10 one need merely rotate the supply spool 12 counterclockwise. Stiffened from being bowed and gripped where the tabs 24, 24 engage the flanges 34, 34 the film will follow the surface of the magazine 14 until the guide 36 urges the film end 28 into the nip of the capstan 16. At this point the normal drive train may take over and thread the film through the reader and into the takeup spool 22.

By way of illustration and not of limitation, the following approximate dimensions have been found to give satisfactory results:

| | |
|---|---|
| Film width | 0.629" |
| Width at tabs | 0.679" |
| Cutout | 0.500"×1.00" |
| Separation of spool flanges | 0.632"-0.660" |

Figure 6:
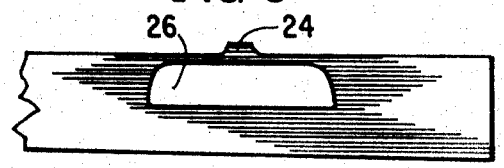
FIG. 6 is an alternative embodiment of the invention.

These dimensions proved satisfactory for standard 16 mm. microfilm but it should be apparent that an endless number of modifications would be acceptable to use the stiffening principle of this invention. Of course even the dimensions listed above would not necessarily be adequate for larger and smaller film or tape widths. FIG. 6 illustrates another embodiment of the invention with but a single tab 24 and a modified cutout 26. The only requirements of this invention being provision of a widened film portion that exceeds the separation of associated supply spool flanges and rendering an interior portion sufficiently weak to allow longitudinal bowing of the leading end. Of course the placement of the widened portion must be far enough from the leading end to permit it to engage the drive train (as illustrated herein by the capstan 12) when the supply spool is rotated within the device. Concurrently the widened portion may not be removed from the leading end to a point where the leading end is unaffected by the bowing of the film. Also it is apparent that placement of the widened portion and associated weakened portion on a leader section which is attached to the film would not affect the spirit and principles of this invention.

An important adjunct of this invention is the fact that the supply spool 12 and the takeup spool 22 may be of identical construction. By providing both the leading end 28 and the captive end (not shown) of a supply with a geometry in accordance with the invention, rewind threading may be accomplished in the same manner as the initial self-threading of the film. For example if the supply of film 30 were run through the reader 10 and thereby completely transferred to the takeup spool 22 the captive end (not shown) would become an upstanding free end with the takeup spool 22. Therefore merely rotating the takeup spool 22 in a clockwise direction would force the leading end into the nip of capstan 18 in a manner like that previously described in conjunction with the initial threading operation.

Thus a means and method for self-threading a device with a supply of elongate limp material has been described. Although this description was made in conjunction with microfilm and a microfilm reader it is clear that the principle of the invention may be conveniently employed with other microfilm devices, movie film devices and magnetic tape devices as well.

Having thus described the invention, what is claimed is:

1. An elongate film adapted for self-threading into an operative device having near one end of said film a localized widened portion, said portion being of greater width than the remainder of said film, comprising at least one tab extending from the edges of said film;

and an internal weakened portion comprising a cutout removed from the edges of said film, said cutout being associated with said widened portion such that squeezing said widened portion bows said film between said widened portion and said one end of said film.

2. The article set forth in claim 1 wherein said widened portion comprises two tabs opposite one another extending from the edges of said film.

3. The article set forth in claim 2 wherein said tabs are substantially trapezoidal and said cutout is substantially rectangular.

* * * * *